(12) United States Patent
Allan et al.

(10) Patent No.: US 8,711,863 B2
(45) Date of Patent: Apr. 29, 2014

(54) VIRTUAL LINKS IN A ROUTED ETHERNET MESH NETWORK

(75) Inventors: David Allan, Ottawa (CA); Nigel Bragg, Weston Colville (GB)

(73) Assignee: Ciena Corporation, Hanover, MD (US)

( * ) Notice: Subject to any disclaimer, the term of this patent is extended or adjusted under 35 U.S.C. 154(b) by 822 days.

(21) Appl. No.: 12/430,671

(22) Filed: Apr. 27, 2009

(65) Prior Publication Data

US 2010/0272110 A1 Oct. 28, 2010

(51) Int. Cl.
H04L 12/28 (2006.01)

(52) U.S. Cl.
USPC ...... 370/395.53; 370/238; 370/254; 370/401; 709/227; 709/241

(58) Field of Classification Search
USPC ........................................................ 370/395.5
See application file for complete search history.

(56) References Cited

U.S. PATENT DOCUMENTS

| | | | |
|---|---|---|---|
| 2002/0141345 A1* | 10/2002 | Szviatovszki et al. | 370/238 |
| 2005/0160171 A1* | 7/2005 | Rabie et al. | 709/227 |
| 2007/0086361 A1* | 4/2007 | Allan et al. | 370/254 |
| 2008/0107027 A1* | 5/2008 | Allan et al. | 370/235 |
| 2008/0172497 A1* | 7/2008 | Mohan et al. | 709/249 |
| 2010/0157846 A1* | 6/2010 | Cooper et al. | 370/254 |

* cited by examiner

*Primary Examiner* — Ayaz Sheikh
*Assistant Examiner* — Hai-Chang Hsiung
(74) *Attorney, Agent, or Firm* — Clements Bernard PLLC; Christopher L. Bernard; Lawrence A. Baratta, Jr.

(57) ABSTRACT

Virtual links may be used to divert traffic within an Ethernet network without affecting overall traffic patterns on the Ethernet network. In one embodiment, the virtual link may be established on the network via a routing system in use on the network. Nodes on a defined path for the virtual link will install forwarding state for the virtual link so that traffic may follow the defined path through the network. The logical view of the virtual link, from a routing perspective however, has the same cost as the shortest path between the endpoints of the virtual link and, accordingly, does not affect other traffic patterns on the network. Once established, the end nodes on the virtual path will have two equal cost paths through the network—one following the shortest path tree and one along the path for the virtual link. The end nodes may use a tie breaking process in an Equal Cost Multi Path (ECMP) selection process to preferentially select the virtual link over the shortest path.

16 Claims, 4 Drawing Sheets

Shortest Path

Shortest Path

Shortest Path

Shortest Path

Shortest Path

Shortest Path

VIRTUAL LINKS IN A ROUTED ETHERNET MESH NETWORK

TECHNICAL FIELD

The present invention relates to Ethernet traffic routing protocols, and in particular to a method and apparatus for implementing virtual links in a routed Ethernet mesh network.

BACKGROUND

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in application Ser. No. 11/537,775, filed Oct. 2, 2006, entitled "Provider Link State Bridging," the content of which is hereby incorporated herein by reference. As described in greater detail in that application, the nodes in a link state protocol controlled Ethernet network exchange hello messages to learn adjacencies of other nodes on the network, and transmit link state advertisements to enable each node on the network to build a link state database. The link state database may be used to compute shortest paths through the network. Each node then populates a Filtering Data Base (FDB) which will be used by the node to make forwarding decisions so that frames will be forwarded over the computed shortest path to the destination. Since the shortest path to a particular destination is always used, the network traffic will be distributed across a larger number of links and follow a more optimal path for a larger number of nodes than where a single Spanning Tree or even multiple Spanning Trees are used to carry traffic on the network.

Link state protocol controlled Ethernet networks generally provide best effort service, in which network elements provide no guarantee that a particular frame will be transmitted across the network, merely that it will be forwarded if possible along the shortest path between any two points. That is, the network elements on a link state protocol controlled Ethernet network do not reserve portions of the bandwidth for particular traffic, but rather transmit traffic on a path assigned on the basis of available physical capacity without considering the actual traffic matrix imposed on the network. This means that any mismatch between offered load and physical network build can result in persistent congestion.

When congestion occurs on the network, traffic will be dropped in transit and will need to be re-sent or, where resending is not possible due to application constraints, the application itself is degraded. The longer term response is to install additional capacity on links that are either overloaded or approaching overload, but a technique to divert some traffic away from a hot spot and onto underutilized parts of the network is required to address problems that emerge between planning cycles. A further useful capability is the ability to completely divert traffic off a specific link for maintenance purposes without disrupting the network topology. Accordingly, providers might find it advantageous to selectively define paths that follow routes other than the shortest paths in a link state protocol controlled Ethernet network.

SUMMARY OF THE INVENTION

Virtual links may be used to divert traffic within an Ethernet network. The virtual link may be advertised with its own cost metric or may be advertised to have the same cost metric as the current shortest path between its end nodes. In one embodiment, the virtual link may be established on the network via a routing system in use on the network. Nodes on a defined path for the virtual link will install forwarding state for the virtual link so that traffic may follow the defined path through the network. Where the virtual link is advertised to have the same cost metric as the current shortest path between the end nodes, inclusion of the virtual link, from a routing perspective, will not affect other traffic patterns on the network. In this embodiment, once established, the end nodes on the virtual path will have two equal cost paths through the network—one following the shortest path tree and one along the path for the virtual link. The end nodes may use a tie breaking process in an Equal Cost Multi Path (ECMP) selection process to preferentially select the virtual link over the shortest path. Placement of the virtual link endpoints, control of metric assignment and control over what multipath permutations the link applies to permits a broad spectrum of traffic manipulation to be supported.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
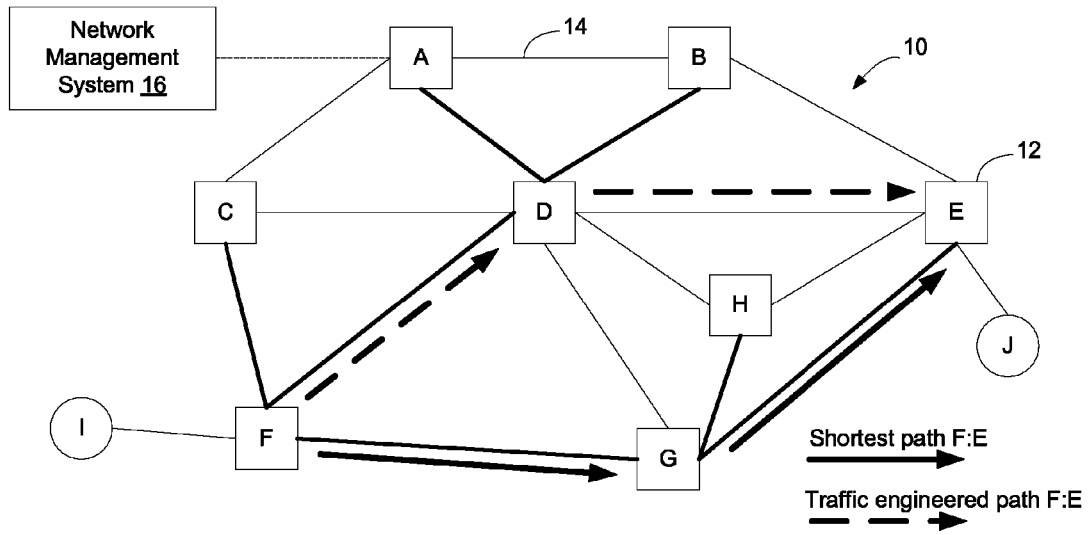
FIG. 1 is a functional block diagram of example link state protocol controlled Ethernet network showing implementation of shortest path forwarding as well as traffic engineered forwarding.

FIG. 1 shows an example Ethernet network 10 including a plurality of switches 12 interconnected by links 14. The Ethernet network will run a Spanning Tree Protocol (STP) to determine which links on the network should be active and which should be blocked. Alternatively, the Ethernet network may implement a routing protocol such as Intermediate System to Intermediate System (IS-IS) to establish more efficient use of network capacity with loop-free shortest path forwarding. An Ethernet network that implements a routing protocol such as IS-IS will be referred to herein as a Link State Protocol Controlled Ethernet Network.

In a link state protocol controlled Ethernet network, rather than utilizing a learned network view at each node by using the Spanning Tree Protocol (STP) algorithm combined with transparent bridging, the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their filtering databases (FDBs) according to the computed view of the network.

At attribute of Ethernet mesh solutions is that multiple topologies can be virtualized by being assigned a unique VLAN. When all nodes have computed their role in the synchronized view and populated their FDBs for a given topology, the network will have a loop-free unicast tree to any given bridge from the set of peer bridges; and a both congruent and loop-free point-to-multipoint (p2mp) multicast trees from any given bridge to the same set of peer bridges. The result is the path between a given bridge pair is not constrained to transiting the root bridge of a spanning tree and the overall result can better utilize the breadth of connectivity of a mesh. Further multiple topologies can be defined via algorithm variations such that a given bridge pair may have a plurality of paths between them, each in a unique virtual topology instance.

Link state protocol controlled Ethernet networks provide the equivalent of Ethernet bridged connectivity, but achieve this via configuration of the network element FDBs rather than by flooding and learning. As such it can be used by emerging standards such as IEEE (Institute of Electrical and Electronics Engineers) standard 802.1ah entitled Provider Backbone Bridges (PBB), or MAC-in-MAC, with configured forwarding of B-MACs (Backbone MAC) and trivial modifications to the PBB adaptation function, to map client broadcast behavior to multicast, such that client Ethernets can utilize the connectivity offered by the link state protocol controlled Ethernet network without modification. MAC configuration may be used to construct shortest path loop-free connectivity (for both unicast and multicast purposes) between a set of (slightly modified) IEEE 802.1ah provider backbone bridges in order to provide transparent LAN service to the C-MAC (Customer MAC) layer or other layer networks that can use a transparent LAN service.

In a link state protocol controlled Ethernet network such as the network shown in FIG. 1, the network elements 12 exchange hello messages to learn adjacencies of other network elements, and exchange link state advertisements to enable each node to build a link state database that may be used to calculate shortest paths between ingress and egress nodes through the network. Additional details associated with an example link state protocol controlled Ethernet network are provided in U.S. patent Ser. No. 11/537,775, entitled "Provider Link State Bridging" the content of which is hereby incorporated herein by reference.

In Provider Link State bridging, a particular algorithm for computing connectivity is associated with a particular B-VID and one consequence is that the network is meshed once per B-VID. Although Ser. No. 11/537,775 is focused on shortest path forwarding, it is simple to envision, because of the plurality of VIDs available in both design and current implementations, that a number of algorithms could be employed simultaneously, each assigned to a distinct VID, and the technique for topology modification described in this disclosure is broadly applicable across the set of possible algorithms, and hence VIDs. This document will discuss two applications of VIDs; those that are employed for the instantiation of virtual links and those that are directly delegated to the routing system. Although the latter are not confined to shortest path algorithms, for simplicity they are termed "shortest path VIDs".

Two examples of link state routing protocols include Open Shortest Path First (OSPF) and Intermediate System to Intermediate System (ISIS), although other link state routing protocols may be used as well. ISIS is described, for example, in ISO 10589, and IETF RFC 1195, the content of each of which is hereby incorporated herein by reference. Although there are current versions of this protocol, the invention is not limited to an implementation based on the current version of the standard as it may be adapted to work with future versions of the standard as they are developed. Similarly, the invention is not limited to an implementation that operates in connection with this particular protocol as other protocols may be used to exchange routing information as well.

In particular instances, such as where congestion is common in a particular area of the network, it may be desirable to explicitly create a virtual link through the network that spans two or more less congested physical links and divert a portion of the traffic onto those less congested links. Likewise, if maintenance is to be performed on the network, it may be desirable to reroute all traffic off a specific link where the maintenance is to be performed. Explicitly specifying the path which traffic should take through some portion of network is commonly referred to as traffic engineering. On a network using shortest path forwarding, such techniques may be used to create explicit paths through the network that do not follow the shortest path on the network.

If a virtual link is to be created on a network, a person such as a network manager will use a facility such as a network management station 16 to define the virtual link that is to be created through the network. The virtual link will then be signaled on the network to cause the nodes to install forwarding state to instantiate the link in a form commonly known as a "tunnel". In a link state protocol controlled Ethernet network, the route of the virtual link and dataplane identifiers to be used (e.g. VLAN ID or VID) may be advertised via the routing system rather than being signaled using a separate signaling protocol. Once installed, traffic that is to flow on the virtual link is distinguished by using a different VID than shortest path traffic, so that frames on the virtual link are able to be distinguished from frames considered to be forwarded over regular links and artifacts of the now non-planar FDB can be resolved. Nodes along the route will install forwarding state for the VID on the virtual link so that when a frame arrives with the VID associated with the virtual link, the frame will be forwarded along the virtual link to the destination. An Ethernet-specific simplification is that the virtual link is point-to-point, and so when instantiated using a specific VLAN it is therefore not required to install MAC forwarding information in addition to the VID information. Other technologies such as MPLS tunnels have similar properties.

The network management system 16 may be used to compute the route required for a virtual link through the network or, alternatively, another process may be used to define the route. In an embodiment of this invention, the Shortest Path (SP) virtual link, defined as having all the attributes of the current shortest path between its end-points from a routing perspective, is another such process Network management systems are well known and the invention is not limited to the use of a particular type of network management system. Additionally, although the illustrated network management system is shown as a separate network element, in practice the network management system may be a standalone device that is connected to the network, may be implemented as a process running on one or more of the network elements, or may be implemented as a process running in connection with other network services. Thus, the invention is not limited by the particular manner in which the network management system is implemented as many different ways of implementing the network management system will be apparent to a person of skill in the art.

Once the intended route of a virtual link has been defined, one or more link state advertisements or signaling transactions may be used to cause the nodes on the network to install forwarding state in their FDBs so that frames addressed using the VID for the virtual link will be forwarded along the defined path, and the ingress and egress will appropriately steer frames on and off the virtual link. Specifically, the network management system may itself generate a link state advertisement and pass the link state advertisement onto the network or, alternatively, the network management system may cause one of the other nodes on the path, such as the node F associated with the source of the traffic engineered path, to generate and transmit a link state advertisement on the network.

The route taken by the virtual link may be defined in any desired manner. For example, the route may be defined using a series of node IDs, link IDs, or combination of node and link IDs and the invention is not limited to the particular manner in which the path is identified to the network elements. The link state advertisement, in this embodiment, may include information about the route, such as a list of nodes, links, or nodes and links, that are to be used to form the virtual link, and any attributes of the virtual link. In one embodiment, an explicit route object may be included in a link state advertisement to enable the path to be specified to the nodes on the network.

When a virtual link is included in the network routing topology database as if it were simply a real link, the network topology has been modified and this may cause other traffic patterns on the network to change. This actually may be desirable, and in one embodiment of the invention the virtual link may have an explicit metric associated with it precisely to modify the distribution of the traffic matrix in the network beyond the scope of simply the virtual link endpoints. The advertisement of virtual links into routing systems as if they were physical links is a well understood Traffic Engineering technique, and we refer to this use of virtual links explicitly as "traffic engineered virtual links" or TE virtual links.

It may also be desirable for any number of reasons for the deployment of a virtual link to modify only the distribution of traffic that flows between the virtual link end points but to be completely transparent to the larger network. A second embodiment of this invention describes how virtual links can be employed in such a way that the larger topology is not perturbed. This is achieved by ensuring that the logical view of a virtual link is identical to the current shortest path between the virtual link endpoints, such that the shifting of traffic from the original path to the virtual link is simply an exercise in tie breaking at the virtual link end points. By maintaining congruency between the logical view of the virtual link and the shortest path, inclusion of the virtual link in the network will not cause traffic flow patterns on the network to be adjusted. We refer to this use as Shortest Path (SP) virtual links.

Both TE virtual links and SP virtual links can share common procedures for advertisement, instantiation in the dataplane, loop avoidance and maintenance but their interpretation and associated algorithms are different. Where the procedures are common it will be referred to as simply a virtual link.

Figure 2:
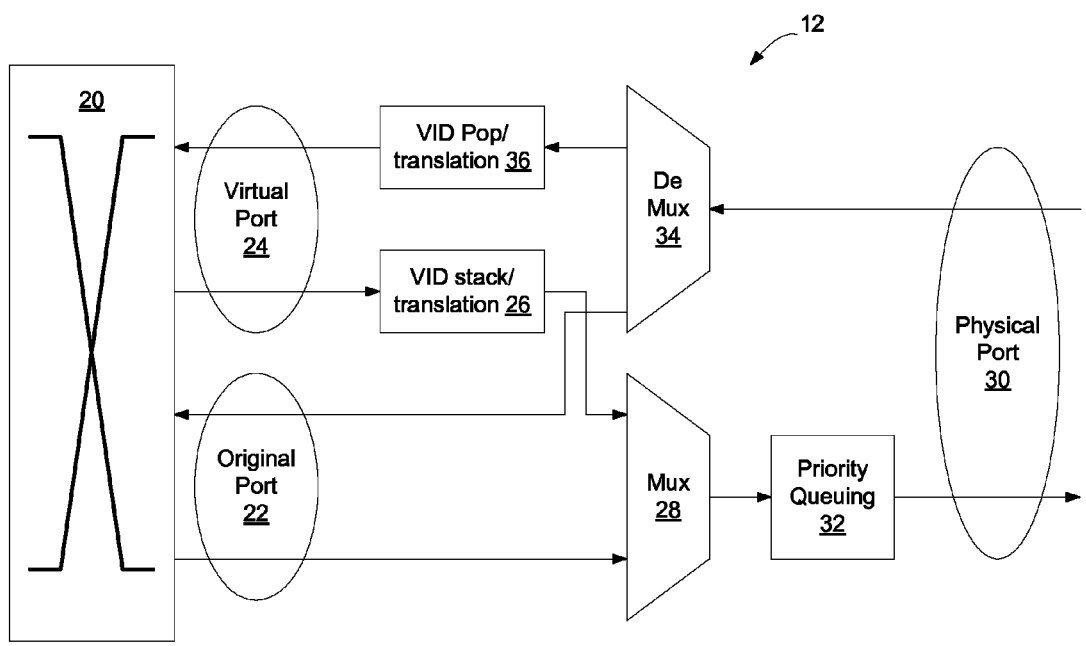
FIG. 2 is a functional block diagram of a port card of a network element that may be used to implement virtual links in a link state protocol controlled Ethernet network.

FIG. 2 shows an example interface on an Ethernet node 12 that may be used to forward traffic onto a virtual link according to an embodiment of the invention. As shown in FIG. 2, the Ethernet node includes switch 20 that implements normal ports 22 and virtual ports 24. The virtual ports are the ingress/egress interfaces to virtual links on the network, and support VID translation 26 to enable a different VID to be applied to traffic to be carried on the virtual link that is connected to that port. This permits virtual link traffic to be multiplexed with normal traffic on physical links. The Ethernet node 12 further includes multiplexer 28 to aggregate traffic from the original port 22 and the VID translated traffic being carried on the virtual link and output the traffic over a physical port 30. Egress queuing resources 32 may be shared by both the physical and virtual link, or may be logically separated, depending on the particular embodiment.

On the ingress, as traffic is received, the traffic will be sent to a demultiplexer 34 where traffic is split to be passed either to the original port 22 or to the virtual port 24. The demultiplexer sends traffic to the original port or to the virtual port depending on the VID carried by the traffic. For example, the demultiplexer 34 forwards any traffic tagged with the virtual link VID to the virtual port 24. Although only a single virtual port 24 is shown, it will be appreciated that there is no restriction on the number of virtual ports which may be associated with a physical port until the limits of the underlying technology is reached, in the Ethernet case the limit being imposed by exhaustion of the VID space. Where the Ethernet node 12 is the end node on the virtual link, the Ethernet node will implement VID translation 36 to either translate the VID back to the normal shortest path forwarding VID or to remove the VID entirely.

Figure 3:
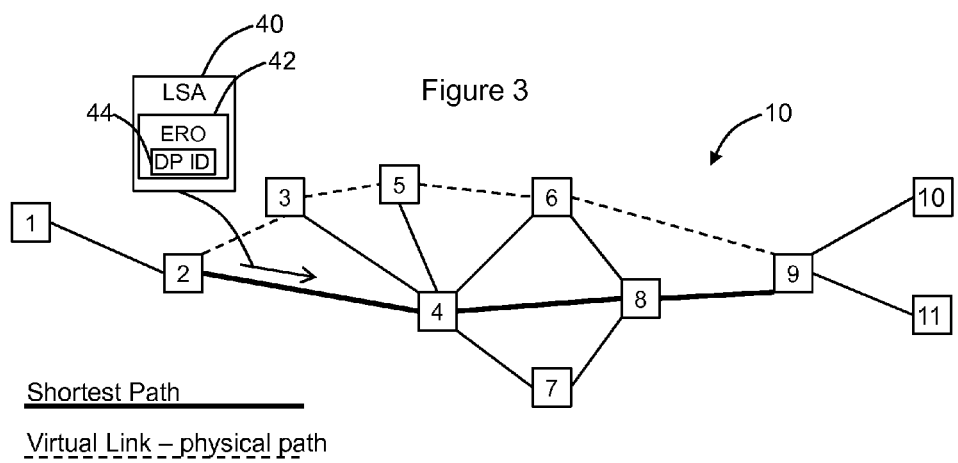
FIG. 3 is a functional block diagram of a reference network showing a physical path of a virtual link through the network.

FIG. 3 shows a reference view of an example Ethernet network including Ethernet nodes 1-11. When a virtual link on a specified path is to be established between a pair of nodes on the network, the virtual link will be advertised using a routing system Link State Advertisement (LSA) 40. The LSA 40 will contain as a minimum, an Explicit Route Object (ERO) 42 defining the path of the virtual link through the network and dataplane identifiers 44 to be used to multiplex the virtual link with the regular traffic and link status information. In the case of Ethernet, a specific VID or VIDs to be used should be part of the LSA and a mapping to the shortest path VID or VIDs with which it is associated. It will also contain a virtual link type, Traffic Engineered or Shortest Path, to specify whether the virtual link is a TE virtual link or a SP virtual link. The start and end points of the virtual link may be explicitly identified in the LSA or may be inferred from the ordering of the ERO. The link status information permits the finite amount of time between creation of the virtual link and its availability for consideration by the routing system to be accommodated. Typically the link is initially unavailable, and once an adjacency can be established across the link it will transition (possibly through intermediate states) to available.

In FIG. 3, it will be assumed that a virtual link is to span between node 2 and node 9. The shortest path is shown using a dark line, and includes nodes 2, 4, 8, and 9. The physical path of the virtual link, in this example, is defined to go through nodes 2, 3, 5, 6, and 9.

The VIDs and mapping information contained in the LSA are dependent on both the procedures employed at the virtual link ingress and egress, and which of the shortest path VIDs the virtual link is to be applied to. If VID stacking is employed, one or more shortest path VIDs will map to a single stacked VID. If VID translation is employed, a unique list of the mapping of shortest path VIDs to virtual link VIDs is required.

When the virtual link is advertised, any nodes on the path specified by the ERO (the dashed line in FIG. 3) will install forwarding state for the virtual link. In the Ethernet case this is achieved by cross connecting the VIDs advertised in the LSA. Each node cross connects the VIDs on the interfaces pointing to it's immediate neighbors in the ERO. The virtual link end points instantiate the virtual link along with a VLAN translation function as an actual interface. From the standpoint of traffic flow in operation, assume that the shortest path forwarding is implemented using VIDs:SPF, and that forwarding on the virtual link will be implemented using VIDs:VL. When the virtual link is advertised on the network, the nodes 2, 3, 5, 6, and 9, will cross connect for VIDs:VL. The end nodes (nodes 2 and 9) will install the set of VIDs:VL as a distinct single interface with VID translation, so that they are able to perform VID translation for any traffic that is required to transit the destination node on the virtual link. In this example, the virtual link end nodes would translate VID:SPF to VID:VL.

In operation, when node 9 receives a frame that is required to transit node 2 (i.e. is addressed to node 2 or node 1), node 9 will translate the VID:SPF to VID:VL and forward the frame on the port to node 6. Node 6 has a cross-connect installed for VID:VL and will forward the frame to node 5. Nodes 5 and 3 likewise have cross-connects installed for VID:VL and will forward the traffic along the physical path for the virtual link toward node 2. When node 2 receives a frame with VID:VL, it will perform VID translation to change the VID:VL to VID:SPF. The extracted frames are forwarded normally. If, for example the frame needs to be forwarded on to node 1, node 2 will then forward the frame on toward node 1.

When a node receives a TE virtual link LSA that indicates the link is available, it will instantiate the link in the routing database as if it were simply a physical link between the end points with the advertised metric. Path computation treats the virtual link no differently than if it were a physical link for the process of FBD generation. There is no modification to the algorithms in any node in the network as all will consider the TE virtual link in their computations. The resultant FDB generated at a TE virtual link end point will point some forwarding entries towards the virtual link just as if it were a real interface.

Figure 4:
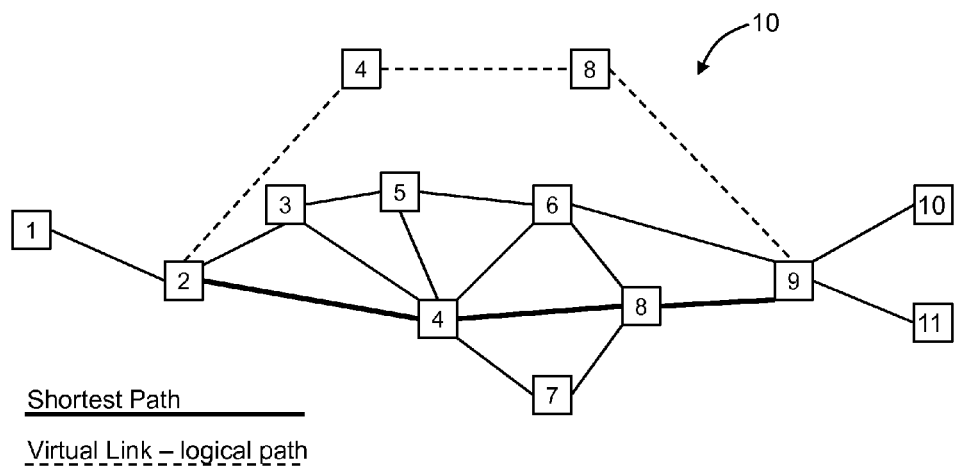
FIG. 4 is a functional block diagram of a reference network showing a logical path of a virtual link through the network where the virtual link is a Shortest Path (SP) virtual link.

SP virtual link LSAs are handled somewhat differently by the nodes on the network. Specifically, upon receipt of an SP virtual link LSA that indicates the virtual link is available, each node will compute, in addition to procedures if it is on the ERO for the virtual link, whether it is on a shortest path tree between the virtual link end points. If it is not, no additional procedures are required. In one embodiment, if a node is on the shortest path between the SP virtual link end points, the node will model the SP virtual link as a point to point path with identical costs and tie breaking information (such as node IDs) to the path in the shortest path tree and modify its database accordingly. FIG. 4 shows an example of how the forwarding database may be modified. In FIG. 4, the SP virtual link (shown in dashed lines) has been added between nodes 2 and 9. The shortest path is shown using dark lines. As indicated in FIG. 4, the logical view of the SP virtual link, which is installed in the topology database, includes the same tie breaking information (e.g. nodes 4 and 8) as the shortest path and also includes the same link costs so that it has the identical cost and tie breaking information (e.g. node IDs) as the shortest path through the network between the end nodes.

Modifying the database enables the trees that will be modified by the availability of the virtual link to be properly instantiated. All changes to normal shortest path procedures occur either on the original shortest path or along the virtual link. This is described in greater detail below. When multiple equal cost paths exist between the SP virtual link endpoints, additional information is required to disambiguate the purpose of the SP virtual link as the intent may be to only move traffic off only one of the equal cost paths. For this reason included in the LSA is a mapping of which routed VIDs are to be considered for diversion to the SP virtual link and the VID translations to use.

The end nodes, 2 and 9, will each see two paths across the network with identical costs—the original shortest path (through the set of nodes 4 and 8), and the SP virtual link which follows a physical path through nodes 3, 5, and 6. However, the routing system will have modeled the SP virtual link as though it passed through nodes 4 and 8. Hence, the end nodes on the SP virtual link will see two paths—the shortest path and the SP virtual path—which have identical costs. According to an embodiment, the ECMP process may be adjusted to preferentially select the SP virtual link over the shortest path, so that traffic may be preferentially forwarded over the SP virtual link through the network.

Since the scenario where the SP virtual link mimics the tie breaking attributes of the original path and is simply preferred, it is not actually modeled within the network topology database by any nodes not on the original shortest path between the SP virtual link end points, and so the inclusion of the SP virtual link on the network will not affect traffic flows on the network other than that between the SP virtual link end points. Since the SP virtual link has the identical properties as the shortest path, other nodes when calculating routes through the network will not have their shortest path calculations skewed by inclusion of the SP virtual link. Accordingly, SP virtual links may be deployed onto the network without disrupting other flows of traffic on the network.

Figure 5:
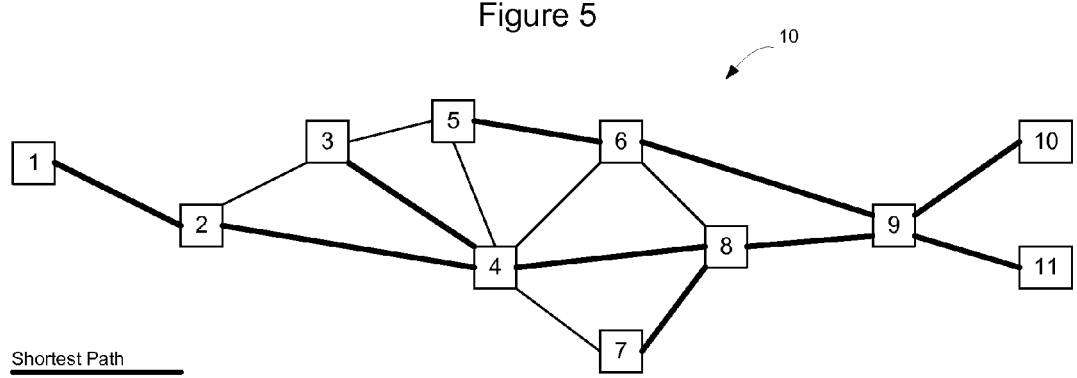
FIG. 5 is a functional block diagram of a reference network showing the shortest path tree to a destination node 9 on the network before inclusion of the SP virtual link.
Figure 6:
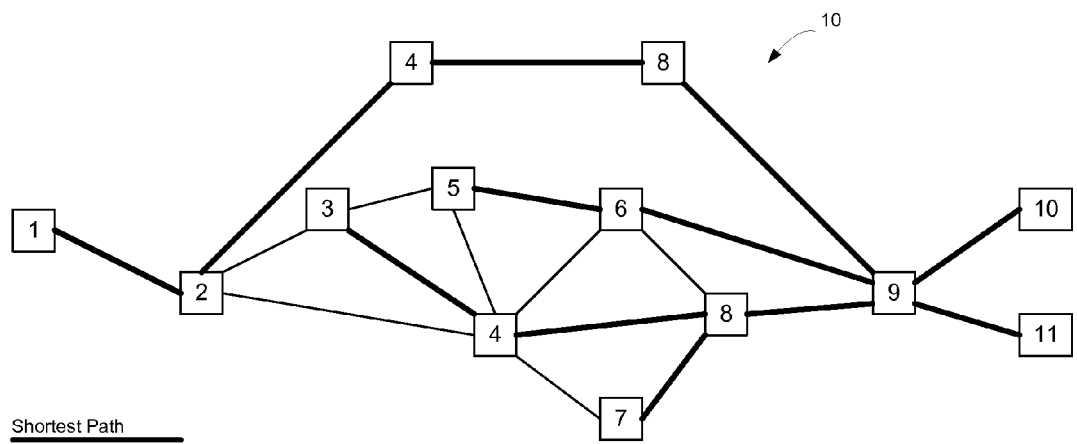
FIG. 6 is a functional block diagram of a reference network showing the shortest path tree to a destination node 9 on the network after inclusion of the SP virtual link.
Figure 7:
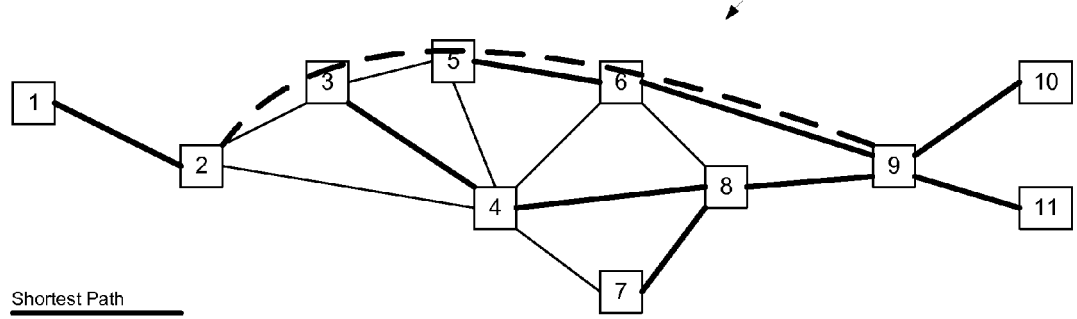
FIG. 7 is a functional block diagram of a reference network showing the actual flow of traffic to node 9 through the network after inclusion of the SP virtual link.

Once a SP virtual link has been included in the network, designated traffic between the virtual link endpoints will preferentially flow over the SP virtual link. This includes broadcast traffic as well as unicast/multicast traffic and, accordingly, the shortest path tree should be pruned to prevent multiple copies of a multicast frame from being delivered to a destination. FIGS. 5-7 show conceptually how the shortest path tree changes upon inclusion of the SP virtual link within the example communication network. Initially, as shown in FIG. 5, the shortest path tree rooted on node 9 appears to include the link between nodes 2 and 4. Upon inclusion of the SP virtual link, however, broadcast traffic will be preferentially provided to node 9 via the SP virtual link (because of the tiebreaking preference for the SP virtual link within the ECMP process). Accordingly, the shortest path tree should be changed as shown in FIG. 6, so that multiple copies of the broadcast traffic are not forwarded to node 2. This outcome is an inherent attribute of the algorithm outlined above.

As shown in FIG. 7, since the SP virtual link between nodes 9 and 2 is actually carried on a defined path including nodes 9, 6, 5, 3, and 2, the actual flow of traffic on the network is shown in FIG. 7, where the dashed line represents the flow of traffic on the physical path associated with the SP virtual link. Thus, traffic that is to be broadcast on the network or traffic that is required to flow within the network past the end node on the SP virtual link will be passed over the SP virtual link along the physical path as shown in FIG. 7.

Figure 8:
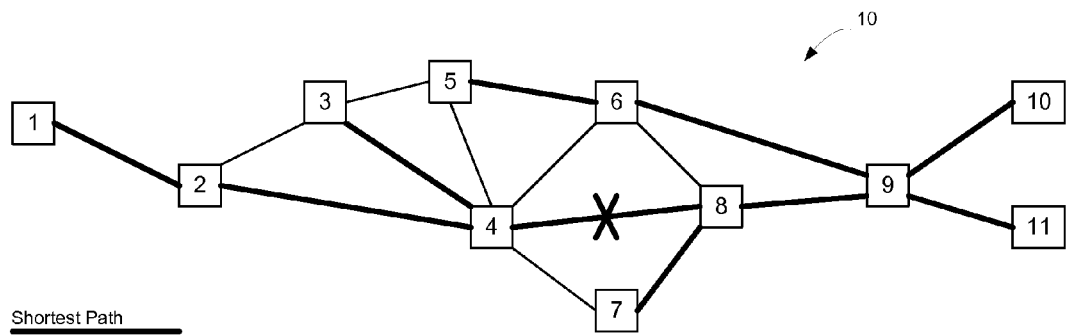
FIG. 8 is a functional block diagram of a reference network showing the shortest path tree on the network prior to occurrence of a scheduled link outage.
Figure 9:
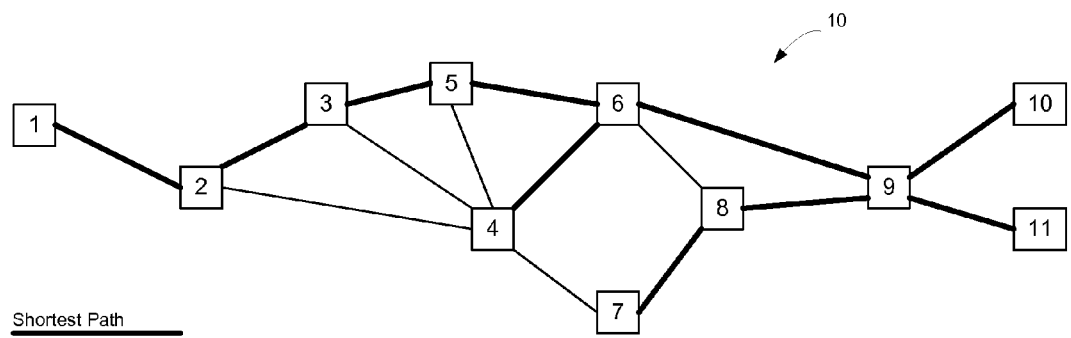
FIG. 9 is a functional block diagram of a reference network showing how the shortest path tree may change because of the occurrence of a scheduled link outage.
Figure 10:
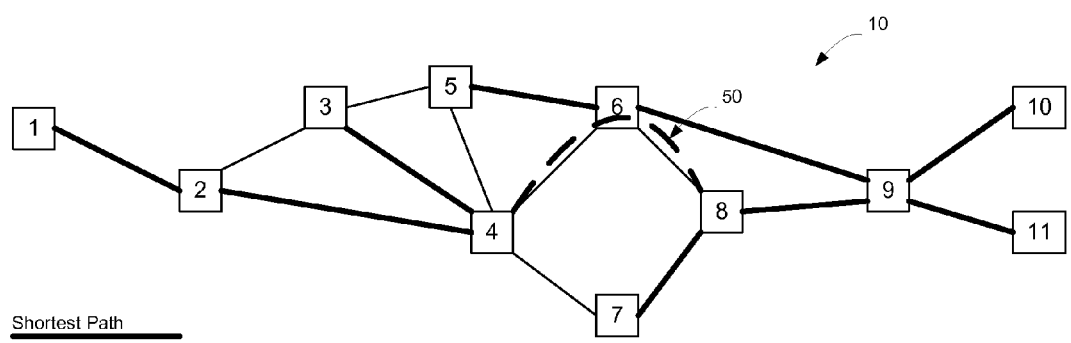
FIG. 10 is a functional block diagram of a reference network showing how a SP virtual link can be used to avoid changing the shortest path tree during the occurrence of a scheduled link outage.

Virtual links may be used for many purposes. One such purpose is to move traffic off particular links on the network when it is necessary to perform maintenance on those links. An example of this is shown in FIGS. 8-10. Specifically, assume that the network administrator would like to take down the link between nodes 4 and 8 for maintenance, as shown in FIG. 8. If the administrator takes the link down without diverting traffic around the link, as shown in FIG. 9, this link failure will cause the shortest path tree through the network to adjust to accommodate the new network topology. For example, as shown in FIG. 9, disabling the link between nodes 4 and 8 can affect the shortest path through the network to nodes 1, 2, 3, and 4. This will likely cause traffic patterns to change dramatically on the network, which is undesirable from a network stability standpoint.

Instead, as shown in FIG. 10, before disabling the link the network administrator may create a TE virtual link 50 between nodes 4 and 8. Since the TE virtual link spans one hop in the network topology and is preferred for tie breaking purposes, upon creation of the TE virtual link 50 all traffic normally flowing on the link between nodes 4 and 8 will automatically be diverted to the virtual link as it is preferred. The TE virtual link in the example shown in FIG. 10 follows a path through node 6, but in other instances the path for the TE virtual link could extend over multiple hops (i.e. from node 4 via nodes 3, 5, 6, and then to 8) depending on the manner in which the path was designed. By creating an TE virtual link 50 between nodes 4 and 8, before administratively disabling the actual link between nodes 4 and 8, traffic may be re-routed through the network so that traffic patterns on the network are not disrupted during this maintenance process. Similar to an SP virtual link, a TE virtual link is preferred for tie breaking purposes.

As noted earlier, both TE and SP virtual links can be advertised by flooding using the routing system. This enables the routing system to cause the virtual link to be established without separately signaling the path through the network and requiring additional protocols, hence is a preferred embodiment. Additionally, inclusion of the virtual link will cause traffic flowing between the pair of nodes to be moved off the shortest path between the nodes onto the virtual link automatically, to thereby redirect traffic within the network onto the virtual link. This enables all traffic between the pair of nodes to be redirected or, optionally, only a portion of the traffic between the nodes to be redirected depending on the placement of the endpoints, and the number of equal cost path variations the virtual link is applied to.

Loop avoidance is required in the network to maintain connectivity during periods of instability (the period between a topology change, advertisement of the topology change by the routing system to all bridges in the network, and reconvergence on a common view of the new topology and corresponding update of forwarding information). Instability in a distributed system frequently means that, at least temporarily, the overall view of the network will not be synchronized. Where the network elements do not have a synchronized view of the network it is possible for transitory loops to be formed. Multicast loops can severely impact a network.

The inclusion of a virtual link in the network raises the possibility of destructive transient multicast loops. In this regard a virtual link is no different than a physical link, which means one solution is to mandate that the same handshaking procedures be observed as for a physical link whenever a topology change in the network results in a change to multicast state. Specifically, each node may implement procedures documented in U.S. patent application Ser. No. 12/260,558 filed Oct. 29, 2008, which describes criteria for handling of state associated with interfaces to achieve loop avoidance, where the virtual interface is subject to the same procedures. The content of this application is hereby incorporated herein by reference.

Specifically, if the node at the ingress to a virtual link determines the distance to a multicast tree root has changed for a given tree, the node will remove state for that tree. For trees for which the distance to the root has decreased, the node will need to synchronize with its neighbor closer to the root to make sure the neighbor is still closer to the root before installing new state for the tree. As long as the neighbor that was previously closer to the root is still closer to the root it is safe to install state for the virtual link. Similarly, if the distance to the root has increased, the node will need to synchronize with its neighbor farther from the root to make sure the neighbor is still farther away from the root before installing state. As long as the neighbor that was previously farther away from the root is still farther away from the root, it is safe to install state for the virtual link. There is no impediment to installing state for trees for which the distance to the root has not changed.

The end nodes will implement this handshake protocol across the virtual link to ensure that there is topology database synchronization for all adjacencies, routing and forwarding. This is implemented to provide loop avoidance and, in one embodiment, can also be used to exchange state information to coordinate setup and teardown of the virtual link.

When a virtual link is placed into service on the network, the virtual link is intended to carry traffic that would normally be carried on the shortest path route through the network. However, it may take a finite amount of time to advertise the existence of the virtual link via the routing system, install forwarding state along the path associated with the virtual link, and implement the handshake process for loop avoidance to ultimately enable the end nodes to divert traffic onto the virtual link.

In one embodiment, the virtual link has an active/inactive state communicated in IS-IS hello messages exchanged over the virtual link similarly to how they would be exchanged over a physical link. The messages are thereby kept local to an adjacency and not flooded throughout the network. If there is a master/slave relationship between the advertiser of the virtual link and the far end, then the advertiser can use this active/inactive state to activate the link once the link has been established and loop control has been implemented. Using a handshake process communicated in hello messages to activate the virtual link enables this detail to be kept out of the routing system so that the end nodes to the virtual link can coordinate this aspect of the virtual link without invoking the routing system and domain-wide advertising attendant to use of the routing system.

To ensure that the virtual link is brought up in a hitless manner (with no loss of traffic), in one embodiment a series of steps is required. First a hello adjacency is established across the virtual link such that a mechanism exists to coordinate procedures between the end points. Once the adjacency has been established, indicating the intermediate nodes have properly cross connected the virtual link, the head-end node will bicast traffic onto both the normal shortest path links and the virtual link during the virtual link initiation process. Initially, the tail end node will see traffic only on the shortest path link and, accordingly, will be able to forward that traffic in the normal manner. Once the virtual link has been established, the tail end node will see the traffic on both the shortest path as well as on the virtual link but only accept traffic on the shortest path link, and can then switch to select only from the virtual link. Once this has occurred, the tail end may shut down the shortest path (drop traffic from the shortest path) and notify the head-end to forward traffic on the virtual link exclusively.

When the virtual link is first advertised on the network, it will be instantiated as administratively down (VID: VL=blocked) by both ends. For convenience the two ends will be referred to as the Owner and the Far End. In one embodiment, the Owner is defined as the first node in the ERO specifying the virtual link.

After hello messages have been exchanged by the Owner and Far End over the virtual link, the Owner will compute a new forwarding database favoring the virtual link in an ECMP tie breaking and send traffic to the Far End on both the virtual link and the shortest path forwarding. The Owner will also send a handshake message to the Far End indicating that the state of the virtual link has been set to Active.

When the Far End receives a handshake message indicating that the state of the virtual link has been set to Active, the Far End will compute a new forwarding database favoring the virtual link in an ECMP tie breaking, and like the Owner, will start to send traffic on both the virtual link and the shortest path forwarding.

The Far End will then block traffic on the old shortest path forwarding port by removing forwarding state from that port and will unblock the virtual link port by enabling VID:VL for ingress traffic. The Far End will then send a handshake message to the Owner indicating that the virtual link is Active and Unblocked.

When the Owner receives the indication that the virtual link is Active, it will block the old shortest path forwarding port to traffic that is intended to be forwarded on the virtual link. It will also unblock the virtual link VID:VL for ingress and send a handshake message to the Far End indicating that the virtual link has been unblocked. The Owner and Far End must communicate the "unblocked" virtual link status to the nodes on the shortest path tree, so that they may prune their multicast trees if required. One example means to achieve this is to issue an IS-IS LSA advertising "virtual link available", by analogy with the standard "link up" LSA, which is flooded to all nodes in the network by normal IS-IS procedures. Nodes on the shortest path tree will not consider the virtual link in their topology calculations until the status advertised by both ends is "Unblocked".

Where the nodes on the network are implementing Reverse Path Forwarding Check (RPFC), which prevents traffic from entering the node via an incorrect port, the nodes may need to turn off RPFC while the virtual link is being established.

When the virtual link is to be taken down, the Owner will issue an IS-IS LSA advertising "virtual link unavailable" to indicate that the virtual link is about to be blocked, and the nodes on the shortest path tree will compute and install new forwarding data bases without the virtual link. This enables the nodes to install forwarding state on the shortest path tree to enable traffic to be forwarded on the network. The Owner and Far End similarly will compute a new forwarding database without the virtual link.

The Owner and Far End may use handshake messages to indicate that the virtual link should be closed. During the handshake process the Owner and Far End may bicast traffic onto both the shortest path tree and virtual link. Depending on the state the Owner and Far End will select traffic from either the virtual link or the shortest path tree so that the removal of the virtual link from the network may occur in a hitless manner.

In the previous description an example has been provided in which a single virtual link is to be added to a network. The invention is not limited in this manner, as multiple virtual links may be established within a communication network. Additionally, multiple virtual links may even be established between the same pairs of nodes, so that different portions of the traffic between the nodes may be carried on different paths through the network.

Where the traffic on the network flowing on the shortest path tree does not all have the same VLAN ID (i.e. B-VID), traffic may be mapped to the virtual link on a per-B-VID basis. Thus, particular B-VIDs may be mapped to the virtual link while other B-VIDs may remain on the shortest path forwarding. Many options are available, as different flows of traffic may selectively be mapped to the virtual links in many different ways. Where traffic is mapped to the virtual link on a per B-VID basis, the link state advertisement establishing the virtual link will include a list of B-VIDs to be carried on the virtual link as well as the explicit route object defining the path through the network.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of using virtual links in a routed Ethernet mesh network, the method comprising the steps of:
   receiving, by a node on the routed Ethernet mesh network, a routing system link state advertisement containing a virtual link description, which incorporates an explicit route object, the explicit route object defining a path for the virtual link through the routed Ethernet mesh network between two end points on the interior of the routed Ethernet mesh network, the virtual link description further specifying a list of dataplane identifiers to be associated with the virtual link on the network and administrative status;
   wherein the virtual link is advertised as having a same cost metric as a shortest path between the two end points instead of its own cost metric such that other traffic patterns on the routed Ethernet mesh network are not disrupted; and
   wherein an Equal Cost Multi Path (ECMP) tie breaking process is used to select between the virtual link and the shortest path between the two end points.

2. The method of claim 1, the method further comprising the steps of determining, by the node, whether the node is on the path for the virtual link through the routed Ethernet mesh network.

3. The method of claim 2, wherein if the node is on the path for the virtual link through the routed Ethernet mesh network, the method further comprising the step of installing a cross-connect for the dataplane identifiers.

4. The method of claim 1, wherein the virtual link is a Traffic Engineered (TE) virtual link, and wherein the routing system link state advertisement advertising the TE virtual link further includes an explicit metric associated with the virtual link.

5. The method of claim 4, further comprising installing, by the node, the TE virtual link in a network routing topology database as if it were a real link on the routed Ethernet mesh network.

6. The method of claim 4, further comprising the step of implementing a handshake protocol to avoid loop formation.

7. The method of claim 1, further comprising the step of implementing a handshake protocol to avoid loop formation.

8. The method of claim 7, wherein the handshake protocol further conveys state information to enable the two end points to coordinate activation and deactivation of the virtual link.

9. An Ethernet node using virtual links in a routed Ethernet mesh network, the Ethernet node comprising:
   an interface configured to receive a routing system link state advertisement containing a virtual link description, which incorporates an explicit route object, the explicit route object defining a path for the virtual link through the routed Ethernet mesh network between two end points on the interior of the routed Ethernet mesh network, the virtual link description further specifying a list of dataplane identifiers to be associated with the virtual link on the network and administrative status;
   wherein the virtual link is advertised as having a same cost metric as a shortest path between the two end points instead of its own cost metric such that other traffic patterns on the routed Ethernet mesh network are not disrupted; and
   wherein an Equal Cost Multi Path (ECMP) tie breaking process is used to select between the virtual link and the shortest path between the two end points.

10. The Ethernet node of claim 9, wherein the Ethernet node is configured to determine whether the node is on the path for the virtual link through the routed Ethernet mesh network.

11. The Ethernet node of claim 10, wherein if the Ethernet node is on the path for the virtual link through the routed Ethernet mesh network, the Ethernet node is configured to install a cross-connect for the dataplane identifiers.

12. The Ethernet node of claim 9, wherein the virtual link is a Traffic Engineered (TE) virtual link, and wherein the routing system link state advertisement advertising the TE virtual link further includes an explicit metric associated with the virtual link.

13. The Ethernet node of claim 12, wherein the Ethernet node is configured to install the TE virtual link in a network routing topology database as if it were a real link on the routed Ethernet mesh network.

14. The Ethernet node of claim 12, wherein the Ethernet node is configured to implement a handshake protocol to avoid loop formation.

15. The Ethernet node of claim 9, wherein the Ethernet node is configured to implement a handshake protocol to avoid loop formation.

16. The Ethernet node of claim 15, wherein the handshake protocol further conveys state information to enable the two end points to coordinate activation and deactivation of the virtual link.

* * * * *